United States Patent
Miranda

(10) Patent No.: US 8,194,875 B2
(45) Date of Patent: Jun. 5, 2012

(54) COMMUNICATION APPARATUS AND HELMET

(75) Inventor: Stephen Alfred Miranda, Sunnybank (AU)

(73) Assignee: Innotech Pty Ltd (AU)

( * ) Notice: Subject to any disclaimer, the term of this patent is extended or adjusted under 35 U.S.C. 154(b) by 1800 days.

(21) Appl. No.: 10/527,300

(22) PCT Filed: Sep. 5, 2003

(86) PCT No.: PCT/AU03/01167
§ 371 (c)(1),
(2), (4) Date: Mar. 9, 2005

(87) PCT Pub. No.: WO2004/023914
PCT Pub. Date: Mar. 25, 2004

(65) Prior Publication Data
US 2006/0227982 A1  Oct. 12, 2006

(30) Foreign Application Priority Data
Sep. 11, 2002 (AU) ................................ 2002951326

(51) Int. Cl.
H04R 1/10 (2006.01)
H04R 25/00 (2006.01)
A61F 11/06 (2006.01)

(52) U.S. Cl. ............ 381/74; 381/72; 381/370; 381/151; 381/376; 381/381

(58) Field of Classification Search .................... 381/74, 381/151, 381, 384, 376, 72, 370
See application file for complete search history.

(56) References Cited

U.S. PATENT DOCUMENTS

| | | | |
|---|---|---|---|
| 3,787,641 A | 1/1974 | Santori | |
| 4,969,534 A | 11/1990 | Kolpe et al. | |
| 4,972,491 A | 11/1990 | Wilcox, Jr. | |
| 5,054,079 A | 10/1991 | Frielingsdorf et al. | |
| 5,125,032 A | 6/1992 | Meister et al. | |
| 5,163,093 A | 11/1992 | Frielingsdorf et al. | |
| 5,323,468 A * | 6/1994 | Bottesch | 381/151 |
| 5,404,577 A * | 4/1995 | Zuckerman et al. | 455/66.1 |
| 5,420,935 A * | 5/1995 | Shinohara et al. | 381/370 |
| 5,790,681 A | 8/1998 | Leppalahti | |
| 5,889,730 A | 3/1999 | May | |
| 5,990,793 A | 11/1999 | Bieback | |
| 6,198,394 B1 | 3/2001 | Jacobsen et al. | |

(Continued)

FOREIGN PATENT DOCUMENTS
EP  0 519 621  12/1992
(Continued)

OTHER PUBLICATIONS

Nov. 28, 2008, State Intellectual Property Office of P.R.C.—Notification of Second Office Action.

(Continued)

*Primary Examiner* — Devona Faulk
(74) *Attorney, Agent, or Firm* — Galbreath Law Offices, P.C.; John A. Galbreath

(57) ABSTRACT

A communication apparatus includes a support structure (41) that is fastenable to a safety helmet (58). A vibration conduction microphone (54) is carried by the support structure. The vibration conduction microphone and the speaker enclosure (43) are positioned so that, when the support structure is fastened to the safety helmet, the vibration conduction microphone and the speaker enclosure come into contact with a rear of the wearer's head.

22 Claims, 6 Drawing Sheets

U.S. PATENT DOCUMENTS

| | | |
|---|---|---|
| 6,209,144 B1 | 4/2001 | Carter |
| 6,298,249 B1 * | 10/2001 | Locarno et al. ............ 455/575.2 |
| 6,668,065 B2 * | 12/2003 | Lee et al. ...................... 381/380 |
| 7,136,494 B2 * | 11/2006 | Watson et al. .................. 381/86 |
| 2003/0083112 A1 | 5/2003 | Fukuda |

FOREIGN PATENT DOCUMENTS

| | | |
|---|---|---|
| GB | 2295291 | 5/1996 |
| JP | 63-097088 | 4/1988 |
| JP | 08-195994 | 7/1988 |
| JP | 01-146497 | 6/1989 |
| JP | 11-215581 | 8/1999 |
| WO | 03/015465 | 2/2003 |

OTHER PUBLICATIONS

May 28, 2008, Supplementary European search report for related European application 03794691.0-1256 (PCT/AU0301167).

* cited by examiner

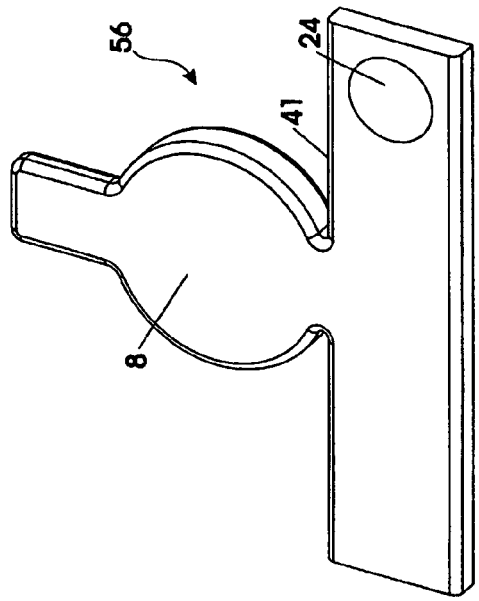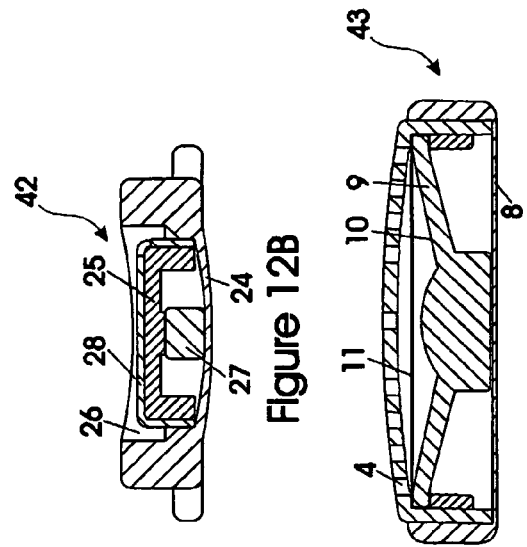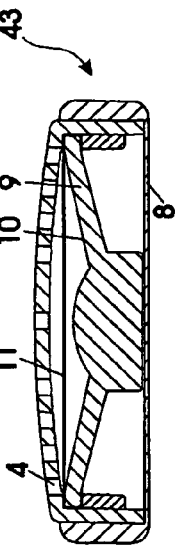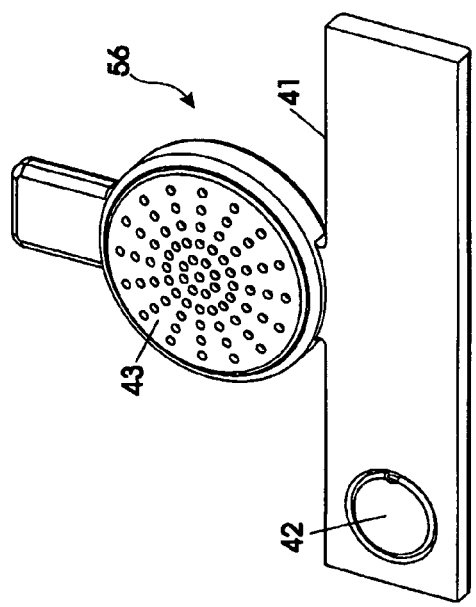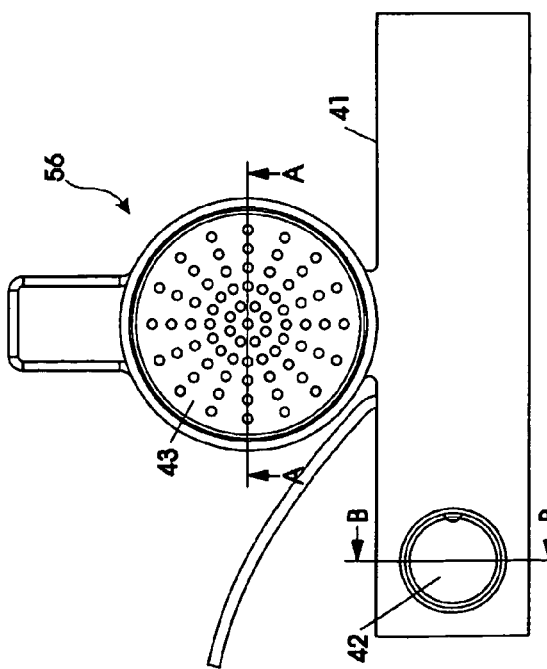

COMMUNICATION APPARATUS AND HELMET

FIELD OF THE INVENTION

The present invention is concerned with improved means for facilitating communication by workers in noisy and hazardous environments.

BACKGROUND TO THE INVENTION

A problem that is particularly faced by workers, such as fire-fighters, in noisy and often hazardous environments, is that it is difficult to clearly communicate with fellow workers, and other parties, when wearing apparatus such as helmets and breathing masks. Several approaches to this problem are described in the prior art. For example, in Japanese Patent Application publication No. JP 11215581-A to Temco Japan Co. Ltd, there is described a bone conduction head-set suitable for mounting under a helmet. The bone conduction microphone is mounted on the top of the head. Such an apparatus is believed to be potentially dangerous as in the event of a load falling upon a wearer of the apparatus the bone conduction microphone may depress the wearer's skull. Other approaches to facilitating communication have involved the use of headphones which cover the ears. While such an approach allows the wearer to readily hear sound from the headphones it prevents the wearer from hearing ambient noise and engaging in direct communication with those nearby.

Where personnel operate in high ambient noise environments there may be a need for hearing protection to be used. However, the use of hearing protection typically interferes with the provision of clear communication.

A further problem that is faced in providing a communication means for firefighters is that the communication means may be damaged by water used by the firefighters in the course of their work.

It is an objective of the present invention to provide means for addressing the above described problems.

SUMMARY OF THE INVENTION

According to a first aspect of the present invention there is provided a communication apparatus including:
 a support structure that is fastenable to a safety helmet;
 a vibration conduction microphone that is carried by the support structure; and
 a speaker enclosure that is also carried by the support structure, the vibration conduction microphone and the speaker enclosure being positioned so that, when the support structure is fastened to the safety helmet, the vibration conduction microphone and the speaker enclosure come into contact with a rear of a wearer's head, in use.

The support structure may be configured to be fastened to a nape strap of the safety helmet.

Preferably both the vibration conduction microphone and the speaker enclosure are waterproof.

According to a second aspect of the invention there is provided a helmet that includes:
 a vibration conduction microphone that is positioned on a part of the helmet; and
 a speaker enclosure that is also positioned on a part of the helmet, the vibration conduction microphone and the speaker enclosure being positioned so that when the helmet is worn, the vibration conduction microphone and the speaker enclosure come into contact with a rear of the wearer's head.

According to a third aspect of the present invention there is provided a speaker enclosure including:
 a housing disposed about a speaker, the housing having at least one opening;
 a resilient diaphragm attached to the housing for contact with the head of a person in use; and
 a membrane sealing the at least one opening thereby shielding the speaker from water.

In a preferred embodiment the housing has first and second openings. The resilient diaphragm may seal the first opening for contact with the head of a person in use and the second opening is sealed by the waterproof membrane.

Preferably the second opening is protected by an acoustically transparent cover.

In a preferred embodiment a cone of the speaker faces the membrane and the acoustically transparent cover.

It is desirable that the housing be dimensioned so that in use energy transfer from the speaker to the person via the resilient diaphragm is maximised.

An electrical cable is typically coupled to the speaker.

Preferably the housing includes an aperture and the electrical cable passes through the aperture.

It is desirable that the aperture be filled with a sealant.

Preferably the sealant provides strain relief to the electrical cable.

Preferably the housing includes a mounting means that may be configured to receive a strap, belt or the like.

A transducer may be located inside the housing adjacent to the resilient diaphragm in order that the speaker enclosure be used to pick-up vibrations from a wearer as well as to transfer vibrations to the wearer. Preferably the transducer is an accelerometer.

The accelerometer is preferably acoustically insulated, for example by means of a visco-elastic layer. A spacer may be attached between the visco-elastic layer and the speaker.

According to a fourth aspect of the invention there is provided a vibration conduction microphone including:
 a transducer;
 an acoustic isolator disposed about the accelerometer; and
 a housing.

Preferably the acoustic isolator includes a visco-elastic material Preferably the acoustic isolator further includes a holder for holding the visco-elastic material.

In a preferred embodiment the transducer comprises an accelerometer.

In one embodiment the housing is a flexible body of, for example, urethane, configured to receive the accelerometer, acoustic isolator and holder.

The housing may include a mounting means. The mounting means may be configured to receive a strap, belt or the like.

According to another aspect of the present invention there is provided a helmet mountable communications apparatus, including transducing means consisting of a vibration conduction microphone and/or a speaker enclosure;
 wherein, the transducing means is mounted at the rear of the helmet so that in use the transducing means contacts the rear of a wearer's head.

Preferably the helmet mounting includes both the vibration conduction microphone and the speaker conduction.

Preferably the vibration conduction microphone is of the type previously described. Similarly it is preferable that the speaker enclosure is of the type previously described.

The transducing means may be conveniently mounted to, or suspended from, a head support member of the helmet such as an internal headband or nape strap of the helmet.

The helmet mounting may be provided in combination with a helmet or alternatively it may be provided separately for retro-fitting to a helmet.

According to another aspect of the invention there is provided a communication apparatus comprising: a vibration conduction microphone; a speaker enclosure including a speaker and arranged to couple vibrations from the speaker to bone of a wearer; and attachment means coupled to each of said microphone and said speaker enclosure to facilitate attachment to an item of headgear for placement of said microphone and speaker enclosure against a rearward portion of the wearer's head, in use.

In some exemplary embodiments, the speaker enclosure includes: a first region to couple vibrations from the speaker to bones of the wearer's head; and a second region to couple vibrations from said speaker element to air for conventional hearing by the wearer. In some exemplary embodiments, the speaker enclosure includes: a housing about a speaker; and a resilient diaphragm attached to the housing, said diaphragm comprising the first region to couple vibrations from the speaker to bones of the wearer's head; the housing defining at least one opening comprising the second region to couple vibrations from said speaker to air for conventional hearing by the wearer. In some exemplary embodiments, a membrane is arranged on the housing to seal the at least one opening thereby shielding the speaker from water. In some exemplary embodiments, there is provided an acoustically transparent cover for the first opening. In some exemplary embodiments, an electrical cable is connected to the speaker to transmit electrical signals to the speaker, the housing defining an aperture accommodating the electrical cable and a sealant interposed between the cable and the housing, the sealant being selected to provide strain relief to the electrical cable. In some exemplary embodiments, a transducer is arranged in the housing adjacent the resilient diaphragm so that the speaker enclosure can be used to pick up vibrations from the wearer as well as to transfer vibrations to the wearer.

In some exemplary embodiments, the attachment means comprises: a first headgear strap engagement means fast with the vibration conduction microphone to receive a strap of the headgear; and a second headgear strap engagement means fast with the vibration conduction speaker enclosure to receive said, or an additional, strap of the headgear. In some exemplary embodiments, the first and second headgear strap engagement means include recesses formed into respective bodies of the vibration conduction microphone and the vibration conduction speaker enclosure to receive the headgear straps.

In some exemplary embodiments, the attachment means comprises a support structure to which the vibration conduction microphone and the vibration conduction speaker enclosure are mounted. In some exemplary embodiments, the headgear comprises a helmet and wherein the attachment means is adapted to be mounted to an internal support of the helmet. In some exemplary embodiments, the headgear comprises a helmet and wherein the attachment means is adapted to be connected to a nape adjustment strap of the helmet.

In some exemplary embodiments, the microphone includes: a housing; a transducer that is positioned in the housing; and an acoustic isolator that is also positioned in the housing and disposed about the transducer. In some exemplary embodiments, the acoustic isolator includes a viscoelastic material. In some exemplary embodiments, the acoustic isolator further includes a holder for holding the viscoelastic material. In some exemplary embodiments, the transducer comprises an accelerometer. In some exemplary embodiments, the housing comprises a flexible body configured to receive the accelerometer, acoustic isolator and holder.

Further preferred features of the invention will be apparent from the following detailed description which will be made with reference to a number of drawings.

BRIEF DESCRIPTION OF THE DRAWINGS

In order that this invention may be more readily understood and put into practical effect, reference will now be made to the accompanying drawings which illustrate typical preferred embodiments of the invention:

FIG. 10 is a first perspective view of a helmet mounting according to a further aspect of the invention.

FIG. 11 is a second perspective view of the helmet mounting of FIG. 10

FIG. 12 is a plan view of the helmet mounting of FIGS. 10 and 11

FIGS. 12A and 12B are cross sectional views.

DETAILED DESCRIPTION OF PREFERRED EMBODIMENTS

Figure 1:
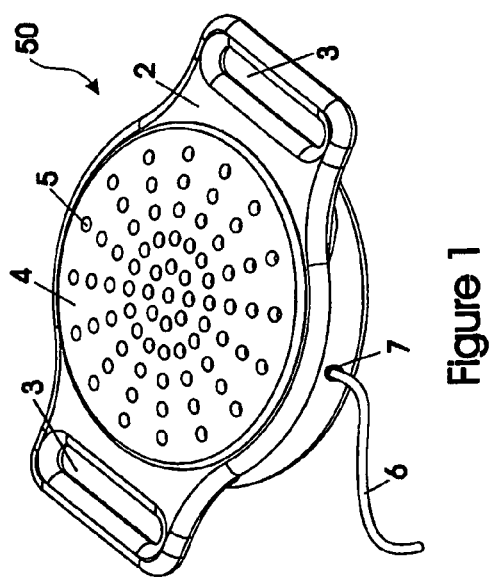
FIG. 1 is a first perspective view of a speaker enclosure according to an embodiment of an aspect of the invention.
Figure 3:
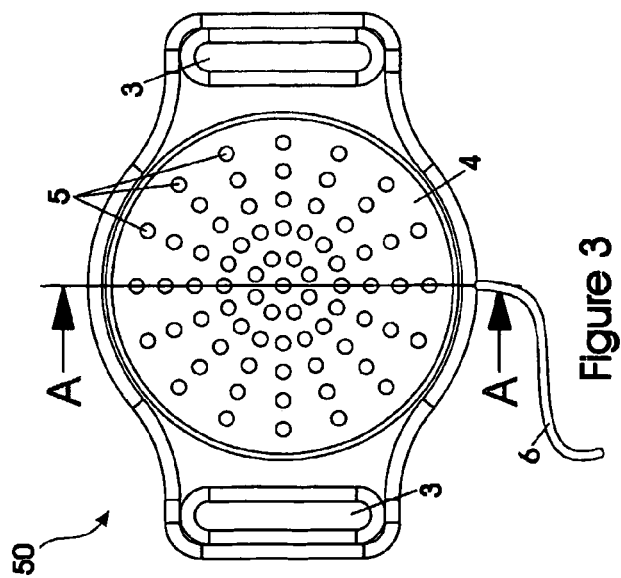
FIG. 3 is a plan view of the speaker enclosure of FIGS. 1 and 2

FIG. 1 is a perspective view of a first side of a speaker enclosure 50 according to a preferred embodiment of the present invention. The term "speaker enclosure" is used herein to refer to a loaded speaker enclosure, i.e., one including a speaker. The speaker enclosure includes a housing 2 which incorporates a mounting means in the form of slots 3 arranged for securing speaker enclosure 50 to a belt, strap or the like. A cover in the form of a grill 4 covers one end of housing 2. Grill 4 is acoustically transparent due to a number of perforations 5 to allow the escape of sound from a speaker located in the housing 2. A cable 6 protrudes through a port 7 formed in housing 2. Cable 6 is connected to a speaker located in the housing 2 as will be shortly explained.

Figure 2:
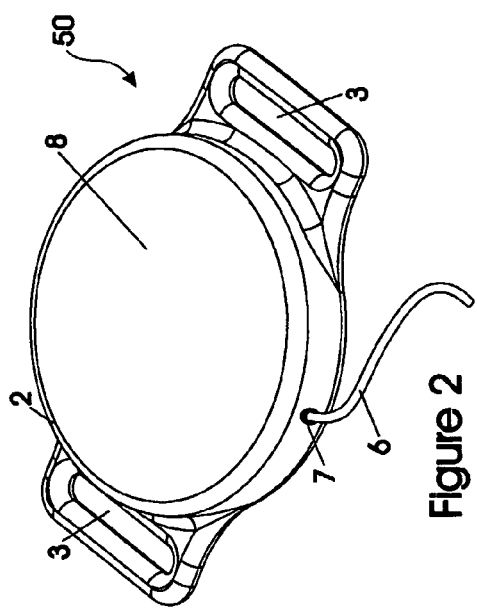
FIG. 2 is a second perspective view of the speaker enclosure of FIG. 1.
Figure 3A:
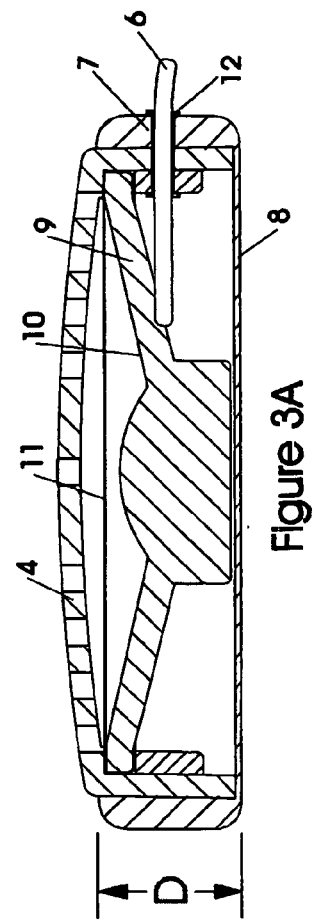
FIG. 3A is a cross-sectional view of the speaker enclosure of FIGS. 1 and 2.

FIG. 2 is a further perspective view of the speaker enclosure 50 showing a diaphragm 8 which is incorporated into housing 2 opposite grill 4. FIG. 3A is a cross section through the speaker enclosure showing an internally located speaker 9 with cone 10 facing grill 4 as shown. Between the speaker cone and the grill there is located a waterproof membrane 11. Port 7 is sealed with a waterproof sealant 12 which surrounds cable 6 and provides strain relief to the cable. It will be realised that the inside of speaker enclosure 50 is waterproofed by virtue of membrane 11, diaphragm 8 and sealant 12.

In use, speaker enclosure 50 is mounted to the side of the head, by means of a band or strap through slots 3, so that diaphragm 8 is brought into contact with the side of the head but preferably not over the ear. An electrical signal from some communication source, for example a walkie-talkie radio, is applied by means of cable 6 to speaker 9. In response speaker cone 10 vibrates so that sound may be heard emanating from grill 4. Simultaneously diaphragm 8 vibrates against the side of the head thereby causing the auricles of the ear to vibrate sympathetically and allowing the hearer to perceive communication. The depth of housing 2, indicated by dimension D in FIG. 3A, is tuned to maximise the coupling of energy from speaker 9 into the wearer's head via diaphragm 8.

Figure 4:
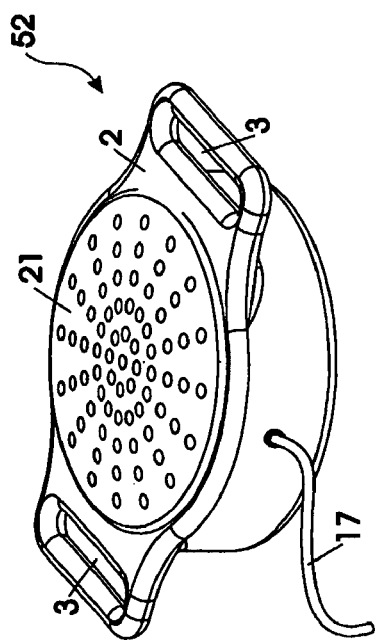
FIG. 4 is a perspective view of a speaker enclosure according to a further embodiment of the invention.

FIG. 4 is a perspective view of a speaker enclosure 52 according to a further embodiment of the invention. With reference to FIGS. 1 to 3A, like reference numerals refer to like parts, unless otherwise specified.

Figure 5A:
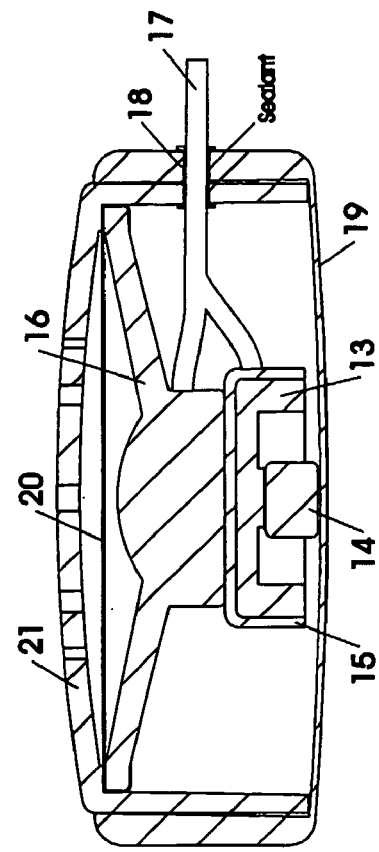
FIG. 5A is a cross sectional view of the speaker enclosure of FIGS. 4 and 5.
Figure 5:
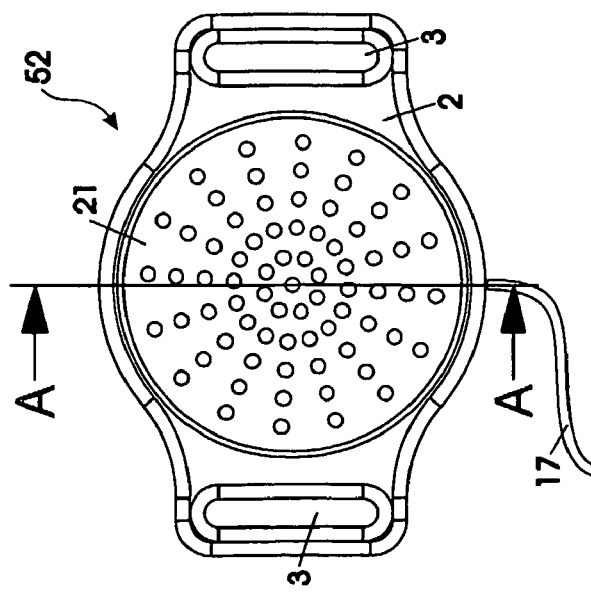
FIG. 5 is a plan view of the speaker enclosure of FIG. 4

FIG. 5A is a cross section of speaker enclosure 52. An acoustic isolator 13, which preferably includes a visco-elastic material such as Sorbothane®, surrounds a transducer in the form of accelerometer 14. A preferred accelerometer is the Knowles Corporation's 1771 single axis accelerometer. Acoustic isolator 13 further includes a transducer cup 15 which anchors the visco-elastic material and which is secured to the rear of speaker 16. Cabling 17 from accelerometer 14 runs out through port 18 along with cabling 17 from speaker 16. A resilient diaphragm 19 forms part of housing 2 as previously described.

In use, resilient diaphragm 19, is placed against the head of a person. In order to transmit a voice signal to the person, speaker 16 is appropriately energised. Vibrations from the speaker are transmitted via resilient diaphragm 19 into the head of the person where they cause sympathetic vibration of the auricles thereby causing the person to perceive the voice signal via bone-based sound conduction. Sound waves generated by speaker 16 also emanate out through membrane 20 and grill 21 and are heard by the person in the normal way. Conversely when the person speaks vibrations pass through resilient diaphragm 19, are picked up by accelerometer 14 and transduced into an electrical signal that is conveyed by cable 17 for further processing. Accelerometer 14 is prevented from picking-up spurious external sounds by acoustic isolator 13.

Figure 6:
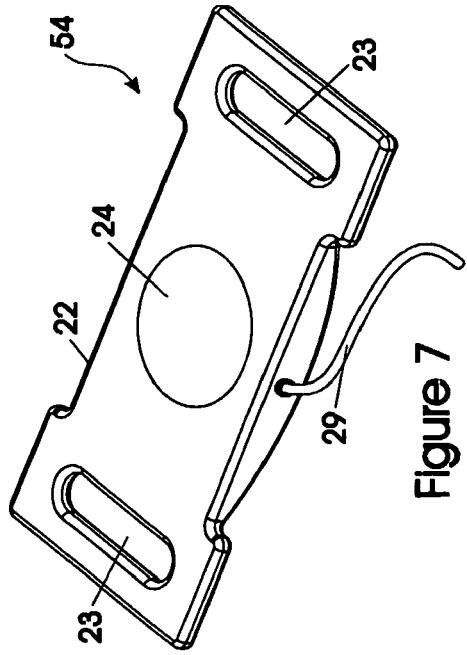
FIG. 6 is a first perspective view of a vibration conduction microphone according
to an embodiment of another aspect of the present invention.
Figure 8A:
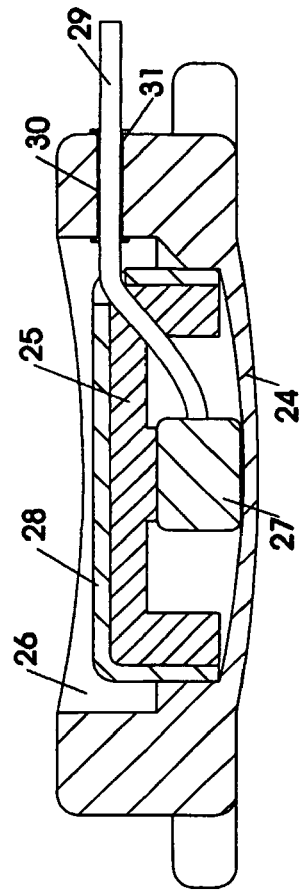
FIG. 8A is a cross-sectional view of the vibration conduction microphone of FIGS. 6 and 7.
Figure 7:
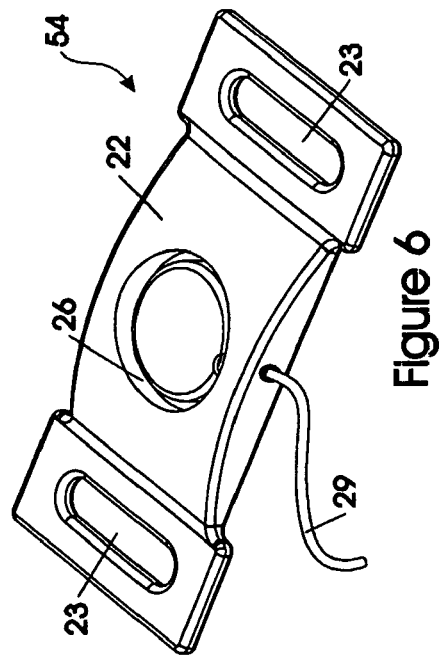
FIG. 7 is a second perspective view of the vibration conduction microphone of FIG. 6.
Figure 8:
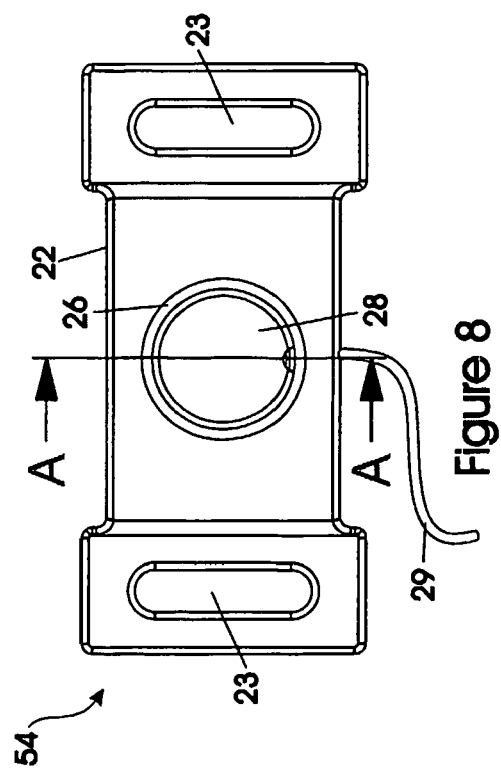
FIG. 8 is a plan view of the vibration conduction microphone of FIGS. 6 and 7.

FIG. 6 is a perspective view of a vibration conduction microphone 54 according to a preferred embodiment of a further aspect of the present invention. FIG. 7 is a second perspective view of vibration conduction microphone 54, FIG. 8A is a cross sectional view of the vibration conduction microphone 54.

Housing 22 has slots 23 for receiving a strap or belt for mounting microphone 54 to the head of a wearer and incorporates a diaphragm 24. Preferably housing 22 is a flexible body of, for example, urethane. Housing 22 has a recess 26.

An acoustic isolator 25 which includes a visco-elastic material such as Sorbothane, surrounds a transducer in the form of an accelerometer 27. A preferred accelerometer is the Knowles Corporation's 1771 single axis accelerometer. Acoustic isolator 25 is a transducer holder in the form of cup 28 which is secured into recess 26 by means of waterproof sealant (not shown). A cable 29 protrudes through a port 30 formed in housing 22. Cable 29 is connected to accelerometer 27 for conveying electrical signals generated by the accelerometer during use for processing. A flexible waterproof sealant 31 seals port 30. It will be realised that the inside of housing 22 is waterproofed by virtue of diaphragm 24 and sealant 31.

In use vibration conduction microphone 54 is secured to the head of a wearer by threading a belt or strap through slots 23 and securing it with diaphragm 24 against the wearer's head. As the wearer speaks, vibrations corresponding to the speech are produced and these are conveyed to the accelerometer 27 which converts them into electrical signals that are conveyed by cable 29 for processing by suitable electronic circuitry.

Figure 9:
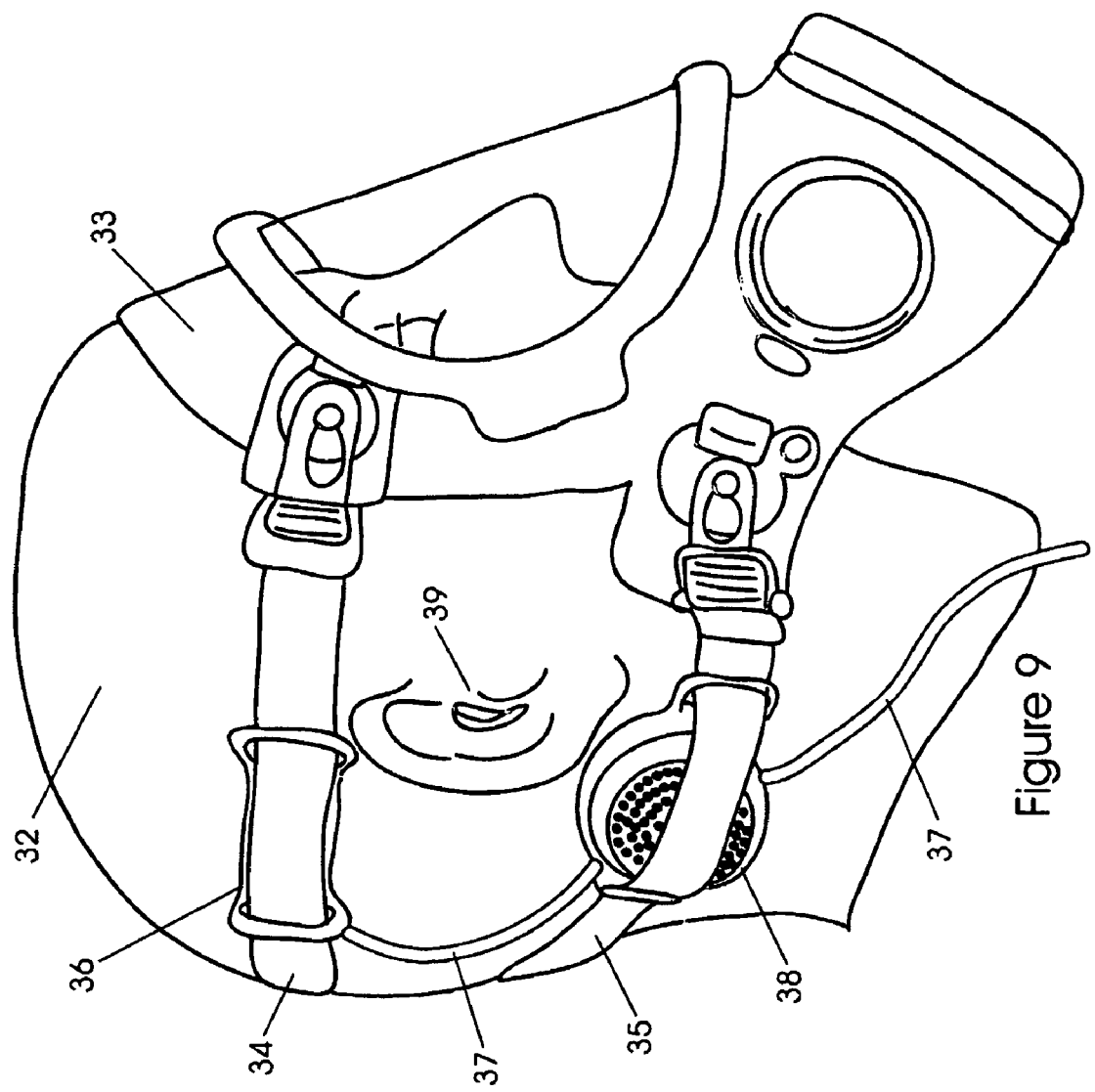
FIG. 9 depicts a use of the speaker enclosure of FIG. 1 and the vibration conduction microphone of FIG. 6.

FIG. 9 shows a person 32 wearing a typical breathing apparatus mask 33 that includes a number of head support straps 34 and 35. Attached to strap 34 is a vibration conduction microphone 36, of the type described with reference to FIG. 6. Attached to strap 35 is a speaker enclosure of the type described with reference to FIG. 1. Cabling 37 from microphone 36 and the speaker enclosure 38 is connected to suitable electronic communication modules (not shown).

The communication modules may include signal conditioning circuitry such as filters to improve the clarity of the communications. It will be noted that the wearer's ear 39 is not covered by speaker enclosure 38 so that the wearer may readily hear ambient sound or wear hearing protection in areas of high ambient noise.

FIG. 10 is a first perspective view of a communication apparatus 56 according to an embodiment of a further aspect of the present invention.

FIG. 11 is a second perspective view of communication apparatus 56. FIG. 12A is a cross-sectional view of a speaker enclosure 43 of the apparatus 56. Enclosure 43 is similar to enclosure 50. FIG. 12B is a cross-sectional view of a vibration conduction microphone 42 of the apparatus 56. Vibration conduction microphone 42 is similar to the microphone 54. It follows that, with reference to FIGS. 1 to 9, like reference numerals refer to like parts, unless otherwise specified.

Figure 14:
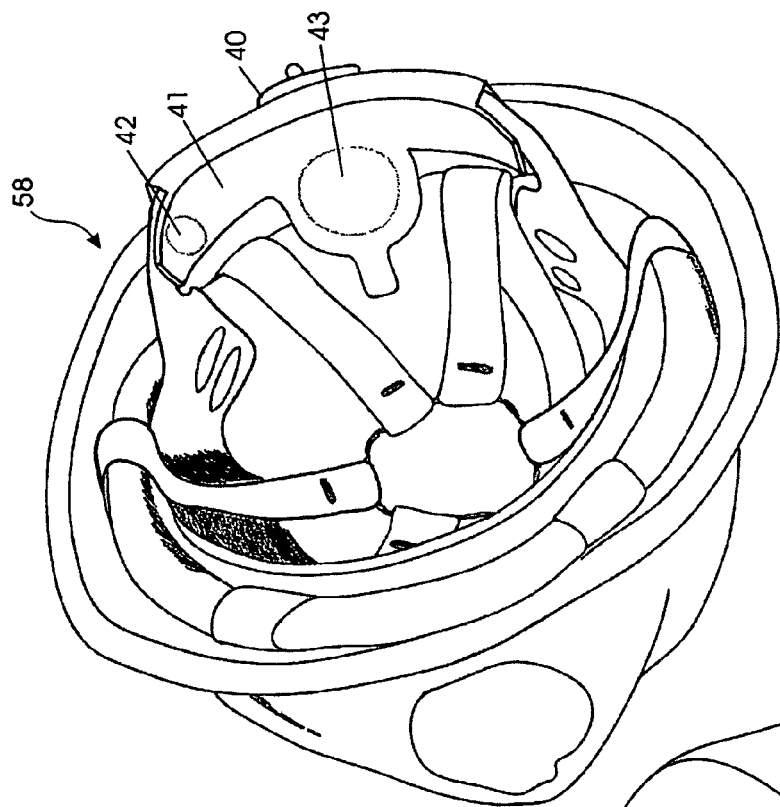
FIG. 14 is a view of the interior of said typical helmet showing the position of the helmet mounting of FIG. 10 in use.

Communication apparatus 56 includes a support structure 41 (shown as a helmet mount in FIG. 14). As can be seen in FIGS. 10 to 12, the speaker enclosure 43 and the microphone 42 are positioned in the support structure 41.

Figure 13:
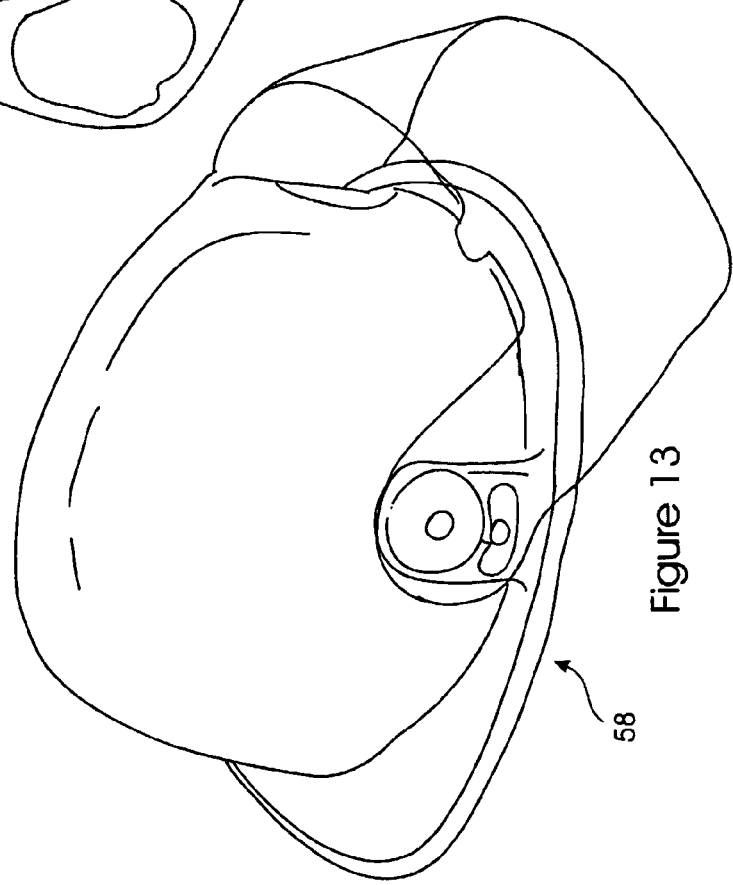
FIG. 13 is an external view of a typical helmet

FIG. 13 is an external view of a typical helmet 58 as used, for example, by fire fighters. FIG. 14 is a view of the interior of said typical helmet 58 showing the positioning of the helmet mountable communication apparatus of FIG. 10.

Communication apparatus 56 is suspended from a nape adjustment strap 40 of helmet 58. Support structure 41 is configured to be connected to nape adjustment strap 40. Speaker enclosure 43 and microphone 42 are positioned on support structure 41 so that diaphragm 24 of vibration conduction microphone 42 and diaphragm 8 of speaker enclosure 43 make contact with the rear of the wearer's head.

The inventors have discovered that the vibration conduction microphone and/or the speaker enclosure may be located at the rear of the head. As discussed previously, this location is in contrast to prior art approaches which mount bone conduction transducers at the top of the head which is a potentially dangerous position. As is also the case with the arrangement depicted in FIG. 14, the wearers ear is not covered by incorporated speaker enclosure so that the wearer may readily hear ambient sound or wear hearing protection in areas of high ambient noise. The inventors have discovered, somewhat surprisingly, that a speaker enclosure and/or bone conduction microphone according to the invention works well when mounted as shown in FIG. 14.

The embodiments of the invention described herein are provided for purposes of explaining the principles thereof, and are not to be considered as limiting or restricting the invention since many modifications may be made by the exercise of skill in the art without departing from the scope of the invention as defined in the appended claims.

The invention claimed is:

1. A communication apparatus comprising:
   a vibration conduction microphone including a housing, a transducer that is positioned in the housing and art acoustic isolator that is also positioned in the housing and disposed about the transducer; said acoustic isolator including a holder holding a visco-elastic material, said transducer comprising an accelerometer, said housing comprising a flexible body configured to receive the accelerometer, the acoustic isolator and holder;
   a speaker enclosure including a speaker and arranged to couple vibrations from the speaker to bone of a wearer; and
   attachment means coupled to each of said microphone and said speaker enclosure to facilitate attachment to an item of headgear for placement of said microphone and speaker enclosure against a rearward portion of the wearer's head in use.

2. A helmet mountable communication apparatus, including transducing means consisting of a vibration conduction microphone and a speaker enclosure; whereto, the transducing means is mounted at the rear of the helmet so that in use the transducing means contacts the rear of a wearer's head;
   and wherein the vibration conduction microphone comprises a housing and an acoustic isolator that is also positioned in the housing, the acoustic isolator being disposed about the transducing means, said acoustic isolator including a visco-elastic material;
   said acoustic isolator further including a holder holding the visco-elastic material, said transducing means comprising an accelerometer, said housing comprising a flexible body configured to receive the accelerometer, acoustic isolator and holder.

3. The helmet mountable communications apparatus of claim 2, wherein the speaker enclosure comprises
   a housing for a speaker, the housing defining at least one opening:
   a resilient diaphragm that is attached to the housing and that is configured to make contact with the head of a person, in use; and a membrane that is arranged on the housing to seal the at least one opening so that the speaker is shielded from water.

4. A speaker enclosure as claimed in claim 3, in which the housing defines first and second openings.

5. A speaker enclosure as claimed in claim 4, in which the resilient diaphragm is arranged on the housing to seal the first opening and the membrane is arranged on the housing to seal the second opening.

6. A speaker enclosure as claimed in claim 4 or claim 5, in which an acoustically transparent cover is positioned on the housing to protect the second opening.

7. A speaker enclosure as claimed in any one of claims 3 to 6, in which a speaker is mounted in the housing and an electrical cable is connected to the speaker to transmit electrical signals to the speaker, the housing defining an aperture for accommodating the electrical cable and a sealant being interposed between the cable and the housing, the sealant being selected to provide strain relief to the electrical cable.

8. A speaker enclosure as claimed in claim 7, in which a mounting means is arranged on the housing, the mounting means being configured to receive a strap, belt or the like.

9. A speaker enclosure as claimed in claim 7 or claim 8, in which a transducer is arranged in the housing adjacent the resilient diaphragm so that the speaker enclosure can be used to pick up vibrations from a wearer as well as to transfer vibrations to the wearer.

10. A helmet mountable communications apparatus according to claim 2 wherein the transducing means is mounted to an internal support of the helmet.

11. A communication apparatus according to claim 1, wherein the speaker enclosure includes:
    a first region to couple vibrations from the speaker to bones of the wearer's head; and
    a second region to couple vibrations from said speaker element to air for conventional hearing by the wearer.

12. A communication apparatus according to claim 11, wherein said speaker enclosure includes:
    a housing about a speaker; and
    a resilient diaphragm attached to the housing, said diaphragm comprising the first region to couple vibrations from the speaker to bones of the wearer's head;
    the housing defining at least one opening comprising the second region to couple vibrations from said speaker to air for conventional hearing by the wearer.

13. A communication apparatus according to claim 12, including a membrane arranged on the housing to seal the at least one opening thereby shielding the speaker from water.

14. A communication apparatus according to claim 13, including an acoustically transparent cover for the first opening.

15. A communication apparatus according to claim 12, including an electrical cable connected to the speaker to transmit electrical signals to the speaker, the housing defining an aperture accommodating the electrical cable and a sealant interposed between the cable and the housing, the sealant being selected to provide strain relief to the electrical cable.

16. A communication apparatus according to claim 12, in which a transducer is arranged in the housing adjacent the resilient diaphragm so that the speaker enclosure can be used to pick up vibrations from the wearer as well as to transfer vibrations to the wearer.

17. A communication apparatus according to claim 1, wherein the attachment means comprises:
    a first headgear strap engagement means fast with the vibration conduction microphone to receive a strap of the headgear; and
    a second headgear strap engagement means fast with the vibration conduction speaker enclosure to receive said, or an additional, strap of the headgear.

18. A communication apparatus according to claim 17, wherein the first and second headgear strap engagement means include recesses formed into respective bodies of the vibration conduction microphone and the vibration conduction speaker enclosure to receive the headgear straps.

19. A communication apparatus according to claim 1, wherein the attachment means comprises a support structure to which the vibration conduction microphone and the vibration conduction speaker enclosure are mounted.

20. A communication apparatus according to claim 19, wherein the headgear comprises a helmet and wherein the attachment means is adapted to be mounted to an internal support of the helmet.

21. A communication apparatus according to claim 19, wherein the headgear comprises a helmet and wherein the attachment means is adapted to be connected to a nape adjustment strap of the helmet.

22. A vibration conduction microphone that includes:
   a housing;
   a transducer that is positioned in the housing; and
   an acoustic isolator that is also positioned in the housing, the acoustic isolator being disposed about the transducer, said acoustic isolator including a vico-elastic material, said acoustic isolator further including a holder holding the visco-elastic material, said transducer comprising an accelerometer, said housing comprising a flexible body configured to receive the accelerometer, acoustic isolator and holder.

* * * * *